US010365958B2

(12) United States Patent
Burden

(10) Patent No.: US 10,365,958 B2
(45) Date of Patent: Jul. 30, 2019

(54) STORAGE DRIVE MANAGEMENT TO FAIL A STORAGE DRIVE BASED ON ADJUSTABLE FAILURE CRITERIA

(71) Applicant: HEWLETT PACKARD ENTERPRISE DEVELOPMENT LP, Houston, TX (US)

(72) Inventor: David C. Burden, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 190 days.

(21) Appl. No.: 15/264,275

(22) Filed: Sep. 13, 2016

(65) Prior Publication Data
US 2018/0074881 A1    Mar. 15, 2018

(51) Int. Cl.
G06F 11/10    (2006.01)
G06F 11/07    (2006.01)
G06F 3/06    (2006.01)

(52) U.S. Cl.
CPC ........ G06F 11/0754 (2013.01); G06F 11/079 (2013.01); G06F 11/0727 (2013.01); G06F 11/1076 (2013.01); G06F 11/1084 (2013.01); G06F 3/0689 (2013.01); G11B 2220/415 (2013.01)

(58) Field of Classification Search
CPC ............... G06F 11/008; G06F 11/0754; G06F 11/1084; G06F 3/0689
See application file for complete search history.

(56) References Cited

U.S. PATENT DOCUMENTS

| 7,398,416 | B2 | 7/2008 | Manoj | |
|---|---|---|---|---|
| 7,523,257 | B2 | 4/2009 | Horn et al. | |
| 7,590,801 | B1 * | 9/2009 | Gavarre | G06F 11/0727 711/114 |
| 8,584,128 | B1 * | 11/2013 | Don | G06F 9/5011 718/100 |
| 8,719,320 | B1 * | 5/2014 | Brooker | G06Q 10/10 707/827 |
| 8,904,230 | B2 | 12/2014 | Goel et al. | |
| 8,935,567 | B1 * | 1/2015 | Martin | G06F 11/1092 714/6.1 |
| 9,015,411 | B2 | 4/2015 | Klemm et al. | |
| 9,189,309 | B1 * | 11/2015 | Ma | G06F 11/3034 |
| 9,766,965 | B2 * | 9/2017 | Waheed | G06F 11/0772 |

(Continued)

OTHER PUBLICATIONS

RAID 2, RAID 3, RAID 4, RAID 6 Explained with Diagram by Ramesh Natarajan, Nov. 21, 2011, https://www.thegeekstuff.com/2011/11/raid2-raid3-raid4-raid6/ (Year: 2011).*

(Continued)

*Primary Examiner* — Joseph O Schell
(74) *Attorney, Agent, or Firm* — Hewlett Packard Enterprise Patent Department

(57) ABSTRACT

Examples disclosed herein relate to storage drive management. Some examples disclosed herein a storage controller may adjust failure criteria for a storage drive and determine whether to fail the storage drive based on the adjusted failure criteria. The storage controller may adjust the failure criteria based on various factors, such as the quantity of input/output (I/O) command abort attempts corresponding to the storage drive issued by a host device.

19 Claims, 3 Drawing Sheets

(56) References Cited

U.S. PATENT DOCUMENTS

| | | | | |
|---|---|---|---|---|
| 9,910,750 | B2* | 3/2018 | Oshima | G06F 11/2094 |
| 9,996,262 | B1* | 6/2018 | Nemawarkar | G06F 3/0604 |
| 2009/0271657 | A1* | 10/2009 | McCombs | G06F 11/004 |
| | | | | 714/6.2 |
| 2013/0262762 | A1* | 10/2013 | Igashira | G06F 12/00 |
| | | | | 711/114 |
| 2015/0074468 | A1* | 3/2015 | Jacoby | G06F 11/008 |
| | | | | 714/47.1 |
| 2015/0205669 | A1 | 7/2015 | Sundaram et al. | |
| 2015/0234709 | A1 | 8/2015 | Koarashi | |
| 2016/0170851 | A1* | 6/2016 | Goldberg | G06F 11/2069 |
| | | | | 714/6.24 |

OTHER PUBLICATIONS

Wikipedia's RAID, historical version published Aug. 31, 2016, https://en.wikipedia.org/w/index.php?title=RAID&oldid=737101425 (Year: 2016).*

Intel Corporation, "Intel® Raid Software User's Guide," (Research Paper), Revision 20.0, Intel Order No. D29305-020, Aug. 2012, 208 pages, available at http://ftp.maxdata.com/MAXDATA_PLATINUM_Server/Driver_and_Utilities/Controller/Intel/Intel_Raid_SWUserGuide_r20_0.pdf.

Adaptec, Inc., "Modifying Your Direct Attached Storage," Adaptec Storage Manager User's Guide for Direct Attached Storage, Chapter 6, 2010, pp. 1-2, 58-79, <http://download.adaptec.com/pdfs/user_guides/asm_v6_50_18579_users_guide_for_das.pdf>.

Samara Lynn, "RAID Levels Explained," Mar. 27, 2014, PC Mag, <https://www.pcmag.com/article2/0,2817,2370235,00.asp>.

* cited by examiner

STORAGE DRIVE MANAGEMENT TO FAIL A STORAGE DRIVE BASED ON ADJUSTABLE FAILURE CRITERIA

BACKGROUND

Storage controllers, such as disk array controllers or redundant array of independent disks (RAID) controllers, may manage various aspects of storage drives. For example, storage controllers may manage access to, and the operation of, storage drives.

BRIEF DESCRIPTION OF THE DRAWINGS

The following detailed description references the drawings, wherein.

DETAILED DESCRIPTION

Figure 1:
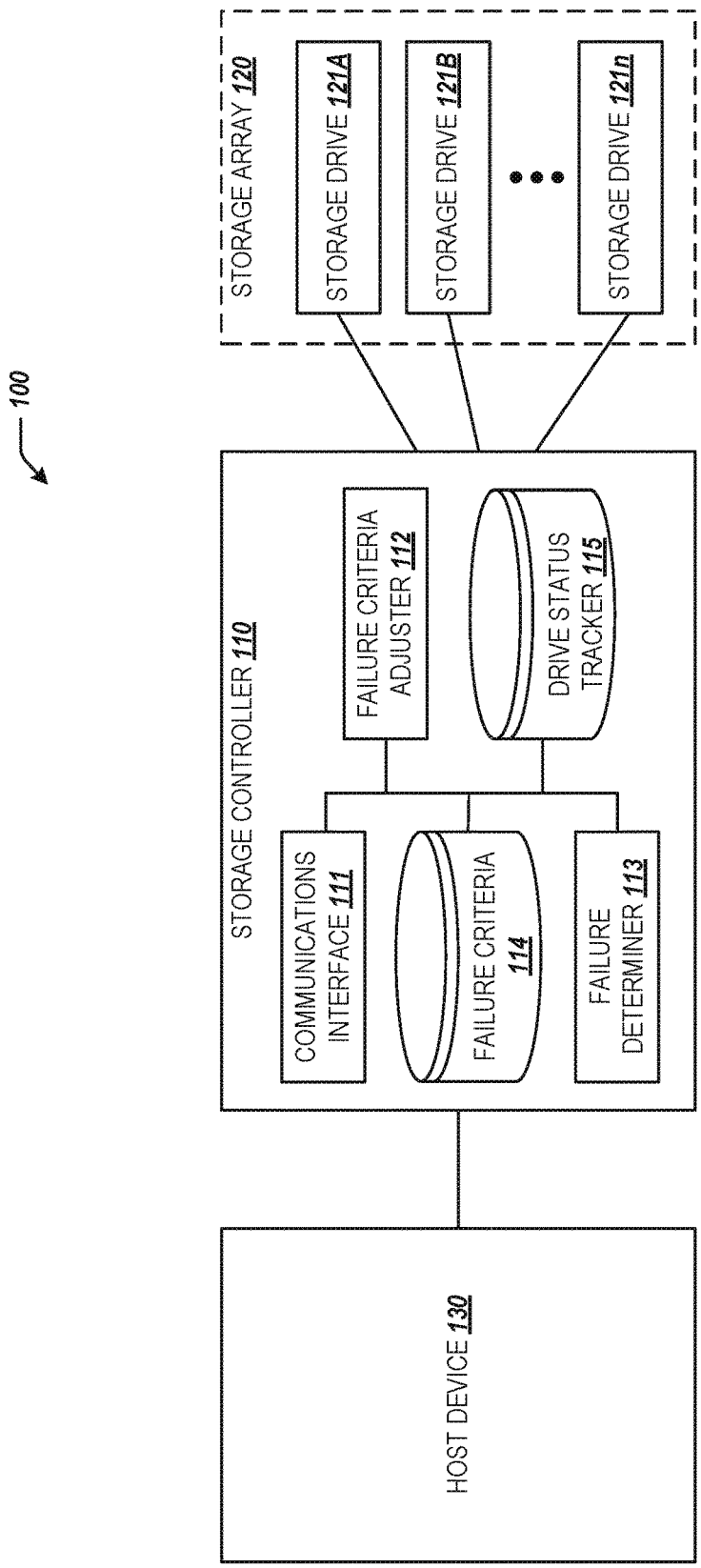
FIG. 1 is a block diagram of an example system for storage drive management.

The following detailed description refers to the accompanying drawings. Wherever possible, the same reference numbers are used in the drawings and the following description to refer to the same or similar parts. It is to be expressly understood, however, that the drawings are for the purpose of illustration and description only. Mile several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

To manage access to storage drives, a storage controller may receive and complete input/output (I/O) commands from various host devices. The I/O commands may be commands, such as commands to read and write data to various storage drives. The host devices may direct the I/O commands to storage volumes, which may be virtual/logical entities comprising a plurality of physical storage drives created by the storage controller and presented to the host devices. To complete a read I/O command from a host device, the storage controller may deconstruct the I/O command to the logical volume by determining storage drives in the volume storing the data associated with the command and may issue drive I/O commands (i.e., drive read commands) to the identified storage drives. The storage controller may receive data in response to the drive I/O commands and provide the received data to the requesting host device. To complete a write I/O command from a host device, the storage controller may receive the data to be written to a logical volume, deconstruct the write I/O command to the logical volume by determining which storage drives included in the logical volume on which the received data is to be written, access the determined storage drives, and write the data to the determined storage drives. In some implementations, such as when the logical volume is a RAID array, the storage controller may calculate additional parity data to be written to storage drive(s) in the logical volume corresponding to the written data.

To manage the operation of storage drives, a storage controller may monitor the performance of the storage drives and determine whether, and when, to fail poorly performing storage drives. In determining whether to fail a storage drive, a storage controller may use failure criteria to make the determination. In some implementations, the failure criteria used by storage controllers may be static. Static drive failure criteria may, however, result in poor storage drive management. For example, static drive failure criteria that is set to aggressively fail storage drives may result in the storage controller failing storage drives unnecessarily, thereby degrading redundancy and incurring operational costs to replace drives that may not need replacing.

As another example, static drive failure criteria that is set to conservatively fail storage drives may result in poor RAID array performance (e.g., increased I/O latency) and degraded redundancy because the storage controller may attempt to correct issues with faulty drives in the RAID array before satisfying I/O commands corresponding to better performing storage drives. This becomes even more of an issue where a host device's criteria for monitoring the performance of the storage controller does not align with the drive failure criteria of the storage controller. For example, the storage controller's drive failure criteria may be more conservative than the storage controller criteria maintained by the host device. The storage controller may attempt to correct issues with poorly performing drives based on the static conservative drive storage criteria, which may result in I/O command response times that are unacceptable to the host device's storage controller failure criteria. As a result, the host device may attempt to abort I/O commands that are taking the storage controller too long to complete, or, if the host device issues too many I/O commands abort attempts to the storage controller, may mark the system controller and/or the logical volume as failed.

Examples disclosed herein provide technical solutions to these technical challenges by providing systems, methods, and computer-readable media for storage drive management. Some examples disclosed herein may enable storage controllers to more efficiently determine whether, and when, to fail storage drives by dynamically adjusting storage drive failure criteria. The storage controller may dynamically adjust a storage drive's failure criteria based on expressions of concern about a storage controller's (and logical volume's) performance, such as attempts to abort I/O commands corresponding to the storage drive, changes in the storage drive's I/O latency and/or I/O error rate, whether the storage controller uses error correcting codes to complete I/O commands. When a storage drive is included in a RAID array, other factors may be used to adjust the storage drive failure criteria such as the level of redundancy in the RAID array. By taking a holistic approach to dynamically adjust storage drive failure criteria, the criteria may be tuned to prevent poorly performing storage drives from causing system failures and degradation in RAID array performance without failing drives prematurely. Moreover, by dynamically adjusting storage drive failure criteria for storage drives included in the logical volume(s) managed by the storage controller, the storage controller may be able to adapt its performance to meet differing standards of storage controller performance used by a multitude of host devices.

FIG. 1 is a block diagram of an example computing system 100 for storage drive management. Computing system 100 may be implemented by a single computing system or a plurality of computing systems communicatively coupled via a network and/or communications interfaces. A computing system, as used herein, may be any type of computing system including, but not being limited to: a laptop, a desktop, an all-in-one device, a thin client, a workstation, a tablet computer, a mobile device, a network-enabled appliance (e.g., a "Smart" television), an Internet of Things (IoT) sensor, a server device, and a storage device.

As shown in FIG. 1, computing system 100 may include various components such as a storage controller 110, a storage array 120 including a plurality of storage drives 121A-121n, and a host device 130. The number and arrangement of these components is an example only and provided for purposes of illustration. Other arrangements and numbers of components may be utilized without departing from the examples of the present disclosure.

Storage drives 121A-121n may be any type of storage drives, such as hard disk drives (HDDs) solid state drives (SSDs), solid-state hybrid drives (SSHDs), or any combination thereof. Storage array 120 may be implemented by various types of storage arrays, such as network-attached storage (NAS) arrays, storage area network (NAS) arrays, or virtualized storage arrays such as RAID arrays. In examples where storage array 120 is implemented as a RAID array, storage array 120 may be represented to host device 130 (and other components in computing system 100) as a logical storage volume. That is, while storage array 120 may include a plurality of storage drives 121A-121n, host device 130 may see storage array 120 as a single storage volume comprised of physical storage drives 121A-121n.

Storage array 120 may also have a level of redundancy when storage array 120 is implemented as a RAID array. The level of redundancy may be based on the RAID configuration of storage array 120. Storage array 120 may have no added redundancy when storage array 120 is configured as RAID 0. In a RAID 0 configuration, data may be striped across storage drives 121A-121n (i.e., each of storage drives 121A-121n stores a portion of the entire data set) without added parity data, redundancy, or fault tolerance. Storage array 120 may have various levels of redundancy when storage array 120 is configured as RAID 1. In a RAID 1 configuration, a data set may be mirrored across storage drives 121A-121n (i.e., each of storage drives 121A-121n stores a copy of the entire data set) without added parity data.

Storage array 120 may have a single level of redundancy when storage array 120 is configured as RAID 4 or RAID 5. In a RAID 4 configuration, data sets may striped across storage drives 121A-121n with a storage drive among storage drives 121A-121n being dedicated to storing parity data for the data sets. In a RAID 5 configuration, data sets may be similarly striped across storage drives 121A-121n, however the parity data for the data sets is distributed across each of storage drives 121A-121n. The parity data for the data sets may be used to satisfy I/O commands (such as read requests) in the presence of failed storage drives in storage array 120. For example, the parity data may be used to calculate data stored on a failed storage drive to complete an I/O command. The parity data may include error correcting codes such as Reed-Solomon codes, Hamming codes, BCH codes, or any other types of error correcting codes.

Storage array 120 may have a double level of redundancy when storage array 120 is configured as RAID 6. In a RAID 6 configuration, data sets may be striped across storage drives 121A-121n and two sets of parity data may be assigned to each data set. Each of the two sets of parity data may be stored on different storage drives among storage drives 121A-121n. The two sets of parity data may be implemented by the same error correcting code types or different error correcting code types.

Host device 130 may communicate storage controller 110. In some examples, host device 130 may provide I/O commands to storage controller 110. When storage array 120 is implemented as a RAID array, the I/O commands may be directed to the logical volume comprising storage drives 121A-121n, The I/O commands may include requests to read data from storage drives 121A-121n and requests to write data to storage drives 121A-121n, Host device 130 may receive data in response to the I/O commands and, in some implementations, confirmations that I/O commands were completed successfully. In some examples, host device 130 may be implemented as a standalone computing system or computing systems. While FIG. 1 shows a single host device 130 in communication with storage controller 110, other example implementations may include a plurality of host devices.

Storage controller 110 may manage access to, and the operation of, storage drives 121A-121n of storage array 120. Storage controller 110 may be implemented by a computing system that includes a processor, such as a central processing unit (CPU), a dedicated integrated circuit such as an ASIC (application-specific integrated circuit), or a dedicated FPGA (field-programmable gate array). The processor may be a single processor or a plurality of processors. The processor may be capable of executing instructions (e.g., stored on a machine-readable storage medium of storage controller 110) that, when executed (e.g., by the processor of system controller 110), offer the functionality of storage controller 110 described herein. In some examples, storage controller 110 may be implemented as a combination of electronic circuitry (i.e., hardware) and software/firmware included in computing system 100 that implements the functionality of storage controller 110. In examples where storage array 120 is a RAID array, storage controller 110 may be implemented as a RAID controller.

Storage controller 110 may include a communications interface (I/F) 111, a failure criteria adjuster 112, a failure determiner 113, failure criteria 114, and a drive status tracker 115. Communications IT 111, failure criteria adjuster 112, and failure determiner 113 may be implemented as hardware, software, or some combination of hardware and software/firmware as described above regarding storage controller 110 generally. Failure criteria 114 and drive status tracker 115 may be stored in a database or across a plurality of databases. The database(s) may be included in storage controller 110 (as shown) and/or other locations of computing system 100. The database(s) may be implemented by logically and/or physically separate databases capable of storing data and may be accessed using methods such as data entry, data transfer, data uploading, etc.

Storage controller 110 may communicate with host device 130 and storage drives 121A-121n via communications interface 111. Communications interface 111 may be implemented as a communications bus (e.g., USB, IEEE 1394, DisplayPort, DVI, HDMI, VGA, Serial port, PCI, PCI-E, SATA, $I^2C$, SCSI, optical communications port, etc), a wired or wireless networking interface (e.g., Ethernet, Wi-Fi, Bluetooth, Near Field Communication, etc.), a cellular communications interface, a Public Switched Telephone Network interface, or any other type of communications interface.

To manage access to storage drives 121A-121n storage controller 110 may communicate with host device 130 to receive I/O commands and provide data and confirmations in response to the received I/O commands. Storage controller 110 may also communicate with storage drives 121A-121n of storage array 120 to complete the received I/O commands. To complete an I/O read command when storage array 120 implemented as a RAID array, storage controller 110 may decompose the I/O read command to the logical volume of storage array 120 into individual queries to storage drives 121A-121n. For example, storage controller 110 may analyze the I/O read command to identify the storage drives among storage drives 121A-121n corresponding to the received I/O command (i.e., storage drives storing data corresponding to the I/O read command), generate individual queries to request the data from the identified storage drives, and provide the data received from the identified storage drives to host controller 130. To complete an I/O write command received from host 130, storage controller 110 may analyze the I/O write command to the logical volume of storage array 120 to identify the storage drives among storage drives 121A-121n to which data corresponding to the I/O write command is to be written, provide queries to the identified storage drives to write the data to the identified storage drives, and, in some implementations, provide a confirmation to host controller 130.

To manage the operation of storage drives 121A-121n, storage controller 110 may monitor the performance storage drives 121A-121n. Poorly performing storage drives may compromise the performance of storage array 120. As a result, I/O commands may become delayed, which in turn compromises the performance of storage controller 110. Host device 130 may sense that the performance of storage controller 110 has been compromised (e.g., the time duration for storage controller 110 to complete I/O commands has exceeded a threshold time duration) and may therefore mark storage controller 110 as failed, which may result in system failure of computing system 100.

To prevent system failure of computing system 100, and to ensure that I/O commands are completed in a timely fashion, failure determiner 113 of system controller 110 may compare the performance of storage drives 121A-121n to failure criteria 114 to determine whether there are storage drives among storage drives 121A-121n that are performing poorly and should therefore be failed. Failing a storage drive may include at least one of ejecting the storage drive from storage array 120, marking the storage drive as failed in drive status tracker 115 such that the storage drive is no longer used to complete I/O commands, and reporting to host device 130 that the storage drive has been removed from use. Storage controller 110 may attempt to complete I/O commands corresponding to failed storage drives using other storage drives among storage drives 121A-121n, (e.g., using parity data or backup data available on other storage drives).

Drive status tracker 115 may include the status of each of storage drives 121A-121n. Storage controller 110 may reference the status of storage drives 121A-121n in drive status tracker 115 before attempting to complete received I/O commands. The status of storage drives 121A-121n may reflect whether each storage drive is operational or failed. Drive status tracker 115 may include other information such as whether each storage drive is idle or active, the I/O latency and/or I/O error rate of each storage drive, and a count of the quantity of attempts made by host device 130 to abort I/O commands corresponding to each storage drive.

Failure criteria 114 may include various factors for determining whether to fail storage drives among storage drives 121A-121n, The various factors may include I/O latency of storage drives 121A-121n, I/O error rate of storage drives 121A-121n, as well as other performance-based factors. In some implementations, storage controller 110 may include global failure criteria 114 that is used for all of storage drives 121A-121n. In some implementations storage controller 110 may include failure criteria 114 specific to each storage drive among storage drives 121A-121n.

I/O latency may be defined as the time duration a storage drive takes to complete I/O commands (e.g., a read or a write command). Failure criteria 114 may include an I/O latency threshold and storage controller 110 may compare the I/O latency of storage drives 121A-121n to the I/O latency threshold to determine whether to fail storage drives among storage drives 121A-121n. The I/O latency threshold may be any time duration, such as 50 milliseconds, 300 milliseconds, 2 seconds, etc. Storage controller 110 may fail storage drives among storage drives 121A-121n in response to determining that the I/O latency for the storage drives exceeds the I/O latency threshold.

I/O latency may be defined as the time duration a storage drive takes to complete I/O commands (e.g., a read or a write command). Failure criteria 114 may include an I/O latency threshold and storage controller 110 may compare the I/O latency of storage drives 121A-121n to the I/O latency threshold to determine whether to fail storage drives among storage drives 121A-121n. The I/O latency threshold may be any time duration, such as 50 milliseconds, 300 milliseconds, 2 seconds, etc. Storage controller 110 may fail storage drives among storage drives 121A-121n in response to determining that the I/O latency for the storage drives exceeds the I/O latency threshold.

I/O error rate may be defined as the quantity of I/O errors (e.g., read errors and write errors) a storage drive experiences while completing I/O commands. Failure criteria 114 may include an I/O error rate threshold and storage controller 110 may compare the I/O error rate of storage drives 121A-121n to the I/O error rate threshold to determine whether to fail storage drives among storage drives 121A-121n. In some examples, the I/O error rate threshold may be a total quantity of I/O errors over the life of the storage drive (i.e., since the storage drive was placed into service). In some examples, the I/O error rate threshold may be an average quantity of I/O errors within a specified time period (e.g., one hour, five days, etc.). Storage controller 110 may fail storage drives among storage drives 121A-121n in response to determining that the I/O error rate for the storage drives exceeds the I/O error rate threshold.

Storage controller 110 may use one or a plurality of the factors included in failure criteria 114 to determine whether to fail storage drives among storage drives 121A-121n. For example, storage controller 110 may use an I/O latency threshold, an I/O error rate threshold, or both. When both an I/O latency threshold and an I/O error rate threshold are used, storage controller 110 may fail storage drives that exceed either the I/O latency threshold or the I/O error rate threshold, or storage controller 110 may fail storage drives that exceed both the I/O latency threshold and the I/O error rate threshold.

In some implementations, storage controller 110 may detect a degradation in the performance of storage drives among storage drives 121A-121n and, in response, may adjust failure criteria 114 for those storage drives so that failure determiner 113 may determine whether to fail storage drives based on the adjusted failure criteria 114. Failure criteria 114 may be adjusted to more aggressively fail storage drives having degraded performance. Accordingly, any potential system-level impact may be prevented by failing suspect storage drives whose performance continues to degrade.

Failure criteria adjuster 112 may adjust failure criteria 114 for storage drives among storage drives 121A-121n based on various factors. One of the factors may include the quantity of attempts made by host device 130 to abort I/O commands corresponding to storage drives 121A-121n. Host device 130 may attempt to abort I/O commands provided to storage controller 110. Host device 130 may abort I/O commands for various reasons, such as the host device 130 (or operator thereof) no longer desires to have the I/O commands completed or there is a delay in storage controller 110 (and storage drives 121A-121n by extension) completing the I/O commands. I/O commands that become delayed may hold up or prevent storage controller 110 from completing other I/O commands. Accordingly, the host device 130 may attempt to abort a delayed I/O command so that storage controller 110 may complete other I/O commands.

When host controller 130 attempts to abort an I/O command directed to a logical volume of storage array 120, storage controller 110 may update the quantity of attempts to abort I/O commands corresponding to each of storage drives 121A-121n maintained in drive status tracker 115. In some examples, storage controller 110 may increment the quantity of attempts for all storage drives 121A-121n in the logical volume of storage array 120 in response to host controller attempting to abort an I/O command to the logical volume. In some examples, storage controller 110 may increment the quantity of attempts for storage drives among storage drives 121A-121n that were provided queries to read or write data associated with the I/O command host controller 130 is attempting to abort.

Failure criteria adjuster 112 may obtain the quantity of attempts to abort I/O command corresponding to each of storage drives 121A-121n issued by a host device 130 from drive status tracker 115. Failure criteria adjuster 112 may compare the quantity of I/O command abort attempts to an I/O command abort attempt threshold. Failure criteria adjuster 112 may adjust failure criteria 114 to be more aggressive (i.e., may decrease the I/O latency and/or I/O error rate thresholds) for storage drives having I/O command abort attempts exceeding the I/O command abort attempt threshold and may adjust failure criteria 114 to be less aggressive (i.e., may increase the I/O latency and/or I/O error rate thresholds) for storage drives having I/O command abort attempts less than the I/O command abort attempt threshold. In some examples, the I/O command abort attempts threshold may be a total quantity of I/O command abort attempts received over the life of the storage drive (i.e., since the storage drive was placed into service). In some examples, the I/O command abort attempts threshold may be an average quantity of I/O command abort attempts within a specified time period (e.g., three hours, two days, etc,).

In some implementations, failure criteria adjuster 112 may adjust failure criteria 114 for storage drives among storage drives 121A-121n based on other factors, such as detecting changes in I/O latency for the storage drives (e.g., adjusting failure criteria 114 in response detecting increases or decreases in I/O latency) and/or detecting changes in I/O error rates for the storage drives (e.g., adjusting failure criteria 114 in response detecting increases or decreases in I/O error rates). In some implementations, failure criteria adjuster 112 may adjust failure criteria 114 for storage drives among storage drives 121A-121n based on the level of redundancy of storage array 120. For example, failure criteria adjuster 112 may increase/decrease the I/O latency and/or I/O error rate thresholds based on the RAID configuration of storage array 120. The threshold(s) may be decreased based on the RAID configuration being RAID 6 (and thus having double redundancy). The threshold(s) may be increased based on the RAID configuration being RAID 0 (and thus having no redundancy). In some implementations, failure criteria adjuster 112 may adjust failure criteria 114 (e.g., decreased the I/O latency threshold and/or I/O error rate threshold) for storage drives among storage drives 121A-121n based on whether storage controller 110 used an error correcting code to complete an I/O request corresponding to the storage drives. In some implementations, failure criteria adjuster 112 may adjust failure criteria 114 based on a combination of the above-described factors.

Figure 2:
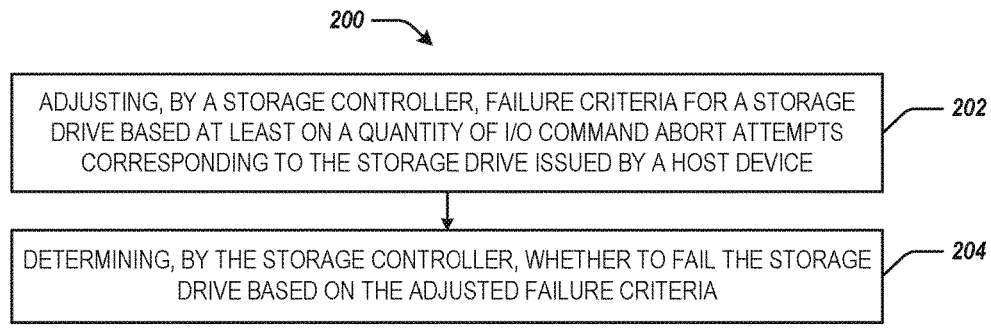
FIG. 2 is a flowchart of an example method for storage drive management.

FIG. 2 is a flowchart depicting an example method 200 for storage drive management. Method 200 may be executed or performed, for example, by some or all of the system components described above in computing system 100 of FIG. 1. Other suitable computing systems may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In some examples, steps of method 200 may be executed substantially concurrently or in a different order than shown in FIG. 2. In some examples, method 200 may include more or less steps than are shown in FIG. 2. In some examples, some of the steps of method 200 may, at certain times, be ongoing and/or may repeat.

At block 202, method 200 may include adjusting, by a storage controller, failure criteria for a storage drive based at least on a number of I/O command abort attempts corresponding to the storage drive issued by a host device. Referring back to FIG. 1, failure criteria adjuster 112 of storage controller 110 may be responsible for implementing block 202. In some examples, adjusting the failure criteria for the storage drive may include adjusting the failure criteria for the storage drive in response detecting an increase in I/O latency or I/O error rate for the storage drive. In some examples, the failure criteria for the storage drive may include at least one threshold for determining whether to fail the storage drive, such as an I/O latency threshold or I/O error rate for the storage drive, and adjusting the failure criteria for the storage drive may include adjusting the at least one threshold based at least on a quantity of I/O command abort attempts corresponding to the storage drive issued by a host device. Adjusting the failure criteria for the storage drive may include decreasing the I/O latency and/or I/O error rate threshold in response to the quantity of I/O command abort attempts exceeding a threshold quantity of I/O command abort attempts.

At block 204, method 200 may include determining, by the storage controller, whether to fail the storage drive based on the adjusted failure criteria. Referring back to FIG. 1, failure determiner 113 of storage controller 110 may be responsible for implementing block 204.

Figure 3:
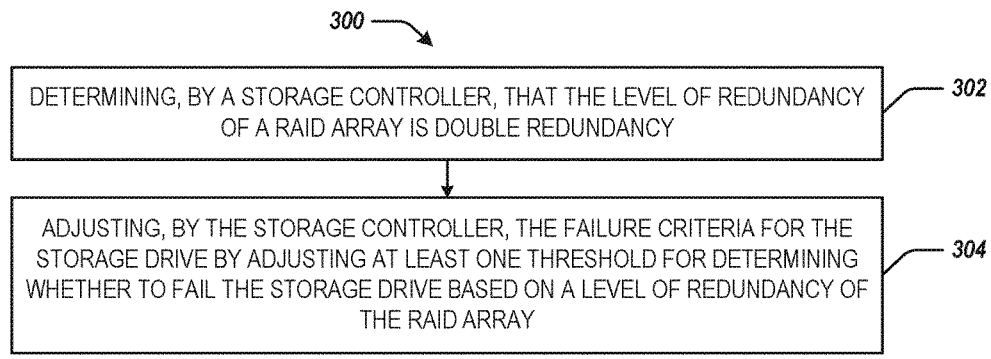
FIG. 3 is a flowchart of an example method for storage drive management.

FIG. 3 is a flowchart depicting an example method 300 for storage drive management. The storage drive may be included among a plurality of storage drives in a RAID array. Method 300 may be executed or performed, for example, by some or all of the system components described above in computing system 100 of FIG. 1.

Other suitable computing systems may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat.

At block 302, method 300 may include determining, by a storage controller, that the level of redundancy of the RAID array is double redundancy. Referring back to FIG. 1, failure criteria adjuster 112 of storage controller 110 may be responsible for implementing block 302.

At block 302, method 300 may include adjusting the failure criteria for the storage drive by adjusting at least one threshold for determining whether to fail the storage drive based on a level of redundancy of the RAID array. Referring back to FIG. 1, failure criteria adjuster 112 of storage controller 110 may be responsible for implementing block 304. In some examples, adjusting the at least one threshold for determining whether to fail the storage drive based on a level of redundancy of the RAID array may include decreasing the at least one threshold for determining whether to fail the storage drive based on determining that the level of redundancy of the RAID array is double redundancy.

Figure 4:
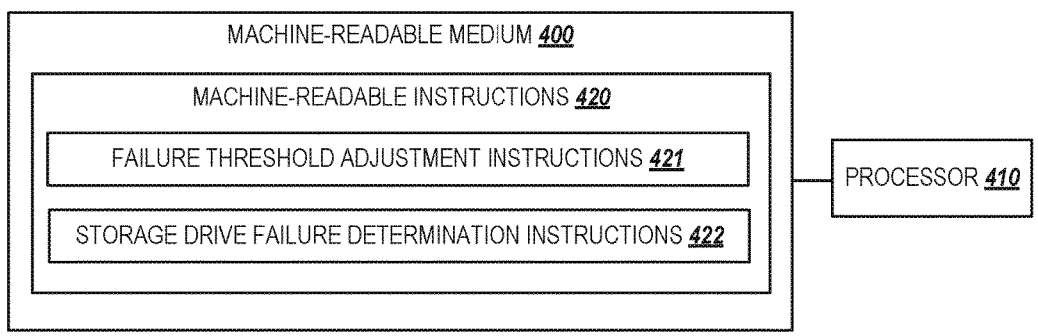
FIG. 4 is a block diagram of an example machine-readable medium for storage drive management.

FIG. 4 is a block diagram of an example machine-readable medium 400 for storage drive management. Machine-readable medium 400 may be communicatively coupled to a processor 410. Machine-readable medium 400 and processor 410 may, for example, be included as part of computing system 100 illustrated in FIG. 1. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 410 may be central processing units (CPUs), microprocessors, and/or other hardware devices suitable for retrieval and execution of instructions stored in machine-readable storage medium 400. In the example shown in FIG. 4, processor 410 may fetch, decode, and execute machine-readable instructions 420 (including instructions 421 and 422) for storage drive management. As an alternative or in addition to retrieving and executing instructions, processor 410 may include electronic circuits comprising a number of electronic components for performing the functionality of the instructions in machine-readable storage medium 400. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 400 may be any electronic, magnetic, optical, or other physical storage device that stores executable instructions. Thus, machine-readable storage medium 400 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Machine-readable storage medium 400 may be disposed within a computing system (e.g., computing system 100 of FIG. 1). In this situation, the executable instructions may be "installed" on the computing system. Alternatively, machine-readable storage medium 400 may be a portable, external or remote storage medium, for example, that allows a computing system to download the instructions from the portable/external/remote storage medium. In this situation, the executable instructions may be part of an "installation package". As described herein, machine-readable storage medium 400 may be encoded with executable instructions for storage drive management.

Referring to FIG. 4, failure threshold adjustment instructions 421, when executed by a processor (e.g., 410), may cause the processor to adjust a failure threshold for a storage drive based at least on a quantity of I/O command abort attempts corresponding to the storage drive issued by a host device, an I/O latency for the storage drive, and an I/O error rate for the storage drive. Failure threshold adjustment instructions 421 may be executable to adjust the failure threshold for the storage drive by decreasing the failure threshold for the storage drive based on at least one of an increase in the I/O latency for the storage drive and an increase in the I/O error rate for the storage drive. Failure threshold adjustment instructions 421 may be executable to adjust the failure threshold for the storage drive based on a threshold quantity of I/O command abort attempt. For example, failure threshold adjustment instructions 421 may be executable to adjust the failure threshold for the storage drive by decreasing the failure threshold for the storage drive in response to the quantity of I/O command abort attempts exceeding the threshold quantity of I/O command abort attempts. As another example, failure threshold adjustment instructions 421 may be executable to adjust the failure threshold for the storage drive by increasing the failure threshold for the storage drive in response to the quantity of I/O command abort attempts not exceeding the threshold quantity of I/O command abort attempts within a specified time period. Storage drive failure determination instructions 422, when executed by a processor (e.g., 410), may cause the processor to determine whether to fail the storage drive based on the adjusted failure threshold.

Figure 5:
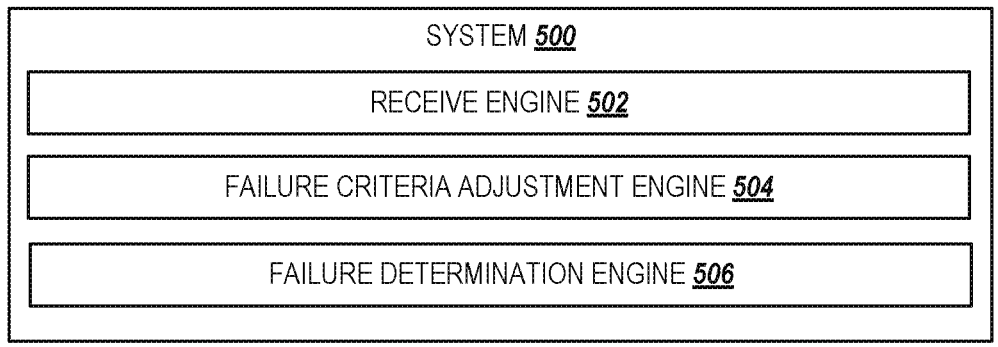
FIG. 5 is a block diagram of an example system for storage drive management.

FIG. 5 is a block diagram depicting an example system 500 for storage drive management. System 500 may include a receive engine 502, a failure criteria adjustment engine 504, and a failure determination engine 506. In some examples, system 500 may be implemented by storage controller 110 of FIG. 1.

The term "engine", as used herein in reference to components 502-506, refers to a combination of hardware and programming that performs a designated function. For example, the hardware of each engine may include a processor or both a processor and a machine-readable storage medium, while the programming is instructions or code stored on the machine-readable storage medium and executable by the processor to perform the designated function.

Referring to FIG. 5, receive engine 502 may include a processor and program instructions that, when executed, cause the processor to receive, from a host device, I/O command abort attempts corresponding to a storage drive among a plurality of storage drives included in a RAID array. Failure criteria adjustment engine 504 may include a processor and program instructions that, when executed, cause the processor to adjust failure criteria for the storage drive based at least on whether a quantity of the received I/O command abort attempts exceeds a threshold quantity of I/O command abort attempts and a RAID configuration of the RAID array. In some implementations, failure criteria adjustment engine 504 may decrease a threshold included in the failure criteria in response to determining that the RAID configuration of the RAID array is RAID 6. In some implementations, failure criteria adjustment engine 504 may adjust the failure criteria for the storage drive in response to using an error correcting code to complete an I/O request corresponding to the storage drive. In some implementations, failure criteria adjustment engine 504 may adjust the failure criteria for the storage drive in response to determining that an I/O latency of the storage drive exceeds an I/O latency threshold.

Failure determination engine 506 may include a processor and program instructions that, when executed, cause the processor to determine whether to fail the storage drive based on the adjusted failure criteria.

Figure 6:
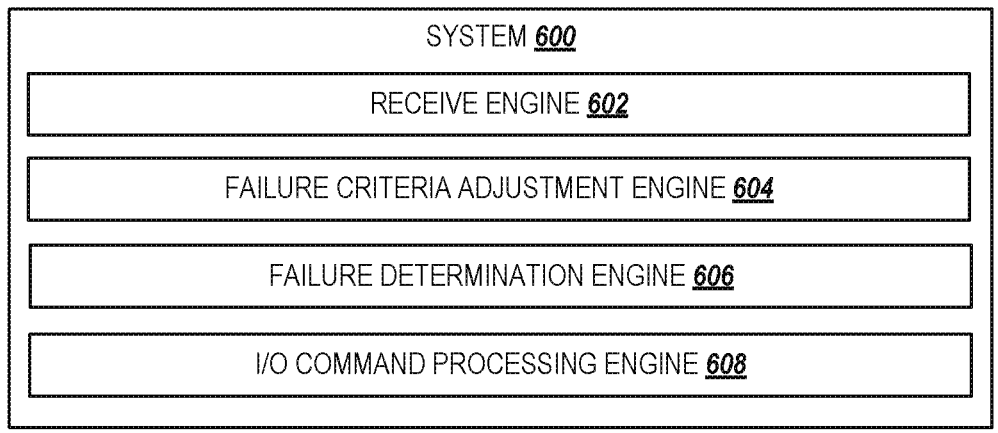
FIG. 6 is a block diagram of an example system for storage drive management.

FIG. 6 is a block diagram depicting an example system 600 for storage drive management. System 600 may include a receive engine 602, a failure criteria adjustment engine 604, a failure determination engine 606, and an I/O command processing engine 608. In some examples, system 600 may be implemented by storage controller 110 of FIG. 1.

The term "engine", as used herein in reference to components 602-608, refers to a combination of hardware and programming that performs a designated function. For example, the hardware of each engine may include a processor or both a processor and a machine-readable storage medium, while the programming is instructions or code stored on the machine-readable storage medium and executable by the processor to perform the designated function.

Referring to FIG. 6, receive engine 602 may include a processor and program instructions that, when executed, cause the processor to receive, from a host device, I/O command abort attempts corresponding to a storage drive among a plurality of storage drives included in a RAID array. Failure criteria adjustment engine 604 may include a processor and program instructions that, when executed, cause the processor to adjust failure criteria for the storage drive based at least on a number of the received I/O command abort attempts and a RAID configuration of the RAID array. Failure determination engine 606 may include a processor and program instructions that, when executed, cause the processor to determine whether to fail the storage drive based on the adjusted failure criteria. More specifically, the program instructions, when executed, may cause the processor to fail the storage drive in response determining that a threshold included in the failure criteria is exceeded. I/O command processing engine 608 may include a processor and program instructions that, when executed, cause the processor to attempt to complete an I/O command corresponding to the storage drive using another storage drive among the plurality of storage drives included in the RAID array.

The foregoing disclosure describes a number of example implementations for storage drive management. The disclosed examples may include systems, devices, machine-readable storage media, and methods for storage drive management. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations.

Moreover, the disclosed examples may be implemented in various environments and are not limited to the illustrated examples. Further, the sequence of operations described in connection with FIGS. 2 and 3 are examples and is not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for storage drive management, the method comprising:

counting, by a storage controller, a quantity of attempts made by a host device to abort input/output (I/O) commands corresponding to a storage drive in a storage array;

determining, by the storage controller, whether the quantity of the I/O command abort attempts corresponding to the storage drive exceeds an I/O command abort attempt threshold;

in response to a determination that the quantity of the I/O command abort attempts corresponding to the storage drive exceeds the I/O command abort attempt threshold, adjusting, by the storage controller, a failure threshold for determining whether to fail the storage drive such that the storage controller is to fail the storage drive based on a lesser amount of performance degradation than prior to the adjustment of the failure threshold;

determining, by the storage controller, to fail the storage drive based on the adjusted failure threshold; and in response to the determination to fail the storage drive, causing, by the storage controller, the storage drive to no longer be used.

2. The method of claim 1, wherein adjusting the failure threshold for determining whether to fail the storage drive includes:

adjusting an I/O error rate threshold for the storage drive; and failing the storage drive in response to a determination that an I/O error rate of the storage drive exceeds the adjusted I/O error rate threshold, wherein the I/O error rate of the storage drive is based on a total number of I/O errors experienced by the storage drive during a specified time period.

3. The method of claim 2, wherein adjusting the I/O error rate threshold for the storage drive includes:
decreasing the I/O error rate threshold in response to the quantity of I/O command abort attempts exceeding the I/O command abort attempt threshold.

4. The method of claim 1, wherein adjusting the failure threshold includes:
adjusting an I/O latency threshold for the storage drive; and
failing the storage drive in response to a determination that an I/O latency of the storage drive exceeds the adjusted I/O latency threshold, wherein the I/O latency of the storage drive is a time duration for the storage drive to complete the I/O commands.

5. The method of claim 4, wherein adjusting the I/O latency threshold for the storage drive includes:
decreasing the I/O latency threshold in response to the quantity of I/O command abort attempts exceeding the I/O command abort attempt threshold.

6. The method of claim 1, wherein:
the storage drive is included among a plurality of storage drives in a redundant array of independent disks (RAID) array; and
adjusting the failure threshold for the storage drive includes adjusting at least one threshold for determining whether to fail the storage drive based on a level of redundancy of the RAID array.

7. The method of claim 6, comprising:
determining, by the storage controller, that the level of redundancy of the RAID array is double redundancy; and
decreasing the at least one threshold for determining whether to fail the storage drive based on determining that the level of redundancy of the RAID array is double redundancy.

8. The method of claim 1, wherein adjusting the failure threshold for the storage drive includes adjusting the failure threshold for the storage drive in response detecting an increase in I/O latency for the storage drive.

9. The method of claim 1, wherein adjusting the failure threshold for the storage drive includes adjusting the failure threshold for the storage drive in response detecting an increase in I/O error rate for the storage drive.

10. A system for storage drive management, comprising:
a processor; and
a non-transitory machine-readable storage medium storing instructions executable by a processor to:
receive, from a host device, input/output (I/O) command abort attempts corresponding to a storage drive among a plurality of storage drives included in a redundant array of independent disks (RAID);
determine whether a quantity of the I/O command abort attempts corresponding to the storage drive exceeds an I/O command abort attempt threshold;
wherein the quantity of the I/O command abort attempts are a quantity of attempts made by a host device to abort I/O commands;
in response to a determination that the quantity of the I/O command abort attempts corresponding to the storage drive exceeds the I/O command abort attempt threshold, adjust a failure threshold for determining whether to fail the storage drive such that the processor is to fail the storage drive based on a lesser amount of performance degradation than prior to the adjustment of the failure threshold;
determine to fail the storage drive based on the adjusted failure criteria threshold; and
in response to the determination to fail the storage drive, cause the storage drive to no longer be used.

11. The system of claim 10, wherein to adjust the failure threshold, the instructions are executable by the processor to decrease the failure threshold in response to determining that a RAID configuration of the RAID array is RAID 6.

12. The system of claim 10, wherein to adjust the failure threshold, the instructions are executable to cause the processor to:
adjust an I/O error rate threshold for the storage drive; and
fail the storage drive in response to a determination that an I/O error rate of the storage drive exceeds the adjusted I/O error rate threshold, wherein the I/O error rate of the storage drive is based on a total number of I/O errors experienced by the storage drive during a specified time period.

13. The system of claim 10, wherein to adjust the failure threshold, the instructions are executable to cause the processor to:
adjust an I/O latency threshold for the storage drive; and
failing the storage drive in response to determining that an I/O latency of the storage drive exceeds the adjusted I/O latency threshold, wherein the I/O latency of the storage drive is a time duration for the storage drive to complete the I/O commands.

14. The system of claim 10, wherein the instructions are executable by the processor to:
fail the storage drive in response to determining that the failure threshold is exceeded; and
attempt to complete an I/O command corresponding to the storage drive using another storage drive among the plurality of storage drives included in the RAID array.

15. A non-transitory machine-readable storage medium comprising instructions executable by a processor of a storage controller for storage drive management, wherein the instructions are executable to cause the storage controller to:
count a quantity of attempts made by a host device to abort input/output (I/O) commands corresponding to a storage drive in a storage array;
determine whether the quantity of the I/O command abort attempts corresponding to the storage drive exceeds an I/O command abort attempt threshold;
in response to a determination that the quantity of the I/O command abort attempts corresponding to the storage drive exceeds the I/O command abort attempt threshold, adjust a failure threshold for determining whether to fail the storage drive such that the storage controller is to more aggressively fail the storage drive;
determine to fail the storage drive based on the adjusted failure threshold; and
in response to the determination to fail the storage drive, cause the storage drive to no longer be used.

16. The non-transitory machine-readable storage medium of claim 15, wherein to adjust the failure threshold, the instructions are executable to cause the processor to:
adjust an I/O latency threshold for the storage drive; and
failing the storage drive in response to determining that an I/O latency of the storage drive exceeds the adjusted I/O latency threshold, wherein the I/O latency of the storage drive is a time duration for the storage drive to complete the I/O commands.

17. The non-transitory machine-readable storage medium of claim 15, wherein to adjust the failure threshold, the instructions are executable to cause the processor to:
   adjust an I/O error rate threshold for the storage drive; and
   fail the storage drive in response to a determination that an I/O error rate of the storage drive exceeds the adjusted I/O error rate threshold, wherein the I/O error rate of the storage drive is based on a total number of I/O errors experienced by the storage drive during a specified time period.

18. The non-transitory machine-readable storage medium of claim 17, wherein the instructions are executable to cause the processor to adjust the failure threshold by decreasing the failure threshold for determining whether to fail the storage drive.

19. The non-transitory machine-readable storage medium of claim 17, wherein the instructions are executable to cause the processor to increase the failure threshold for determining whether to fail the storage drive in response to the quantity of I/O command abort attempts not exceeding the I/O command abort attempt threshold within a specified time period.

\* \* \* \* \*